US011113642B2

(12) United States Patent
Marshall et al.

(10) Patent No.: US 11,113,642 B2
(45) Date of Patent: Sep. 7, 2021

(54) MOBILE APPLICATION FOR ASSISTING A TECHNICIAN IN CARRYING OUT AN ELECTRONIC WORK ORDER

(71) Applicant: CommScope Connectivity UK Limited, London (GB)

(72) Inventors: Owen Marshall, Denbighshire (GB); Simon Colley, Gwyneld (GB); Kevin David Townend, Deeside (GB); Ian Butler, Cheadle (GB)

(73) Assignee: CommScope Connectivity UK Limited, London (GB)

( * ) Notice: Subject to any disclaimer, the term of this patent is extended or adjusted under 35 U.S.C. 154(b) by 380 days.

(21) Appl. No.: 14/037,871

(22) Filed: Sep. 26, 2013

(65) Prior Publication Data

US 2014/0089028 A1    Mar. 27, 2014

Related U.S. Application Data

(60) Provisional application No. 61/706,460, filed on Sep. 27, 2012.

(51) Int. Cl.
*G06Q 10/06* (2012.01)
*G06Q 10/10* (2012.01)

(52) U.S. Cl.
CPC .......... *G06Q 10/063114* (2013.01); *G06Q 10/06311* (2013.01); *G06Q 10/06316* (2013.01); *G06Q 10/103* (2013.01)

(58) Field of Classification Search
None
See application file for complete search history.

(56) References Cited

U.S. PATENT DOCUMENTS

| 4,446,454 A * | 5/1984 | Pyle ............... G08B 13/00 340/521 |
| 5,052,940 A | 10/1991 | Bengal |
| 5,161,988 A | 11/1992 | Krupka |
| 5,195,902 A | 3/1993 | Bengal |
| 5,299,944 A | 4/1994 | Larabell et al. |
| 5,394,503 A | 2/1995 | Dietz, Jr. et al. |

(Continued)

FOREIGN PATENT DOCUMENTS

| CN | 1322356 A | 11/2001 |
| CN | 1622555 A | 6/2005 |

(Continued)

OTHER PUBLICATIONS

"ID Tag Requirements for Infrastructure and Network Elements Management", Dec. 2011, pp. 1-32, Publisher: International Telecommunication Union.

(Continued)

*Primary Examiner* — Stephanie Z Delich
(74) *Attorney, Agent, or Firm* — Fogg & Powers LLC

(57) ABSTRACT

One embodiment is directed to a mobile application executing on a smartphone that is used to assist a technician in carrying out electronic work orders. In some embodiments, the mobile application uses a camera in the smartphone to take photos that are associated with one or more steps of the work order. In some embodiments, the mobile application is used to cause one or more LEDs associated with a step of the work order to be illuminated or otherwise visually actuated.

15 Claims, 13 Drawing Sheets

(56) References Cited

U.S. PATENT DOCUMENTS

| | | | |
|---|---|---|---|
| 5,418,334 A | 5/1995 | Williams |
| 5,420,512 A | 5/1995 | Spillane et al. |
| 5,448,675 A | 9/1995 | Leone et al. |
| 5,461,693 A | 10/1995 | Pimpinella |
| 5,463,706 A | 10/1995 | Dumont et al. |
| 5,473,715 A | 12/1995 | Schofield et al. |
| 5,483,467 A | 1/1996 | Krupka |
| 5,487,666 A | 1/1996 | DiGiovanni |
| 5,541,586 A | 7/1996 | Wise |
| 5,550,755 A | 8/1996 | Martin et al. |
| 5,606,664 A | 2/1997 | Brown et al. |
| 5,649,001 A | 7/1997 | Thomas et al. |
| 5,764,043 A | 6/1998 | Czosnowski et al. |
| 5,821,510 A | 10/1998 | Cohen et al. |
| 5,832,071 A | 11/1998 | Voelker |
| 5,854,824 A | 12/1998 | Bengal et al. |
| 5,876,240 A | 3/1999 | Derstine et al. |
| 5,909,464 A | 6/1999 | Cohen et al. |
| 5,910,776 A | 6/1999 | Black |
| 6,002,331 A | 12/1999 | Laor |
| 6,222,908 B1 | 4/2001 | Bartolutti et al. |
| 6,223,219 B1 | 4/2001 | Uniacke et al. |
| 6,234,830 B1 | 5/2001 | Ensz et al. |
| 6,238,235 B1 | 5/2001 | Shavit et al. |
| 6,240,090 B1 | 5/2001 | Enhager |
| 6,285,293 B1 | 9/2001 | German et al. |
| 6,300,877 B1 | 10/2001 | Schannach et al. |
| 6,307,880 B1 | 10/2001 | Evans et al. |
| 6,330,307 B1 | 12/2001 | Bloch et al. |
| 6,350,148 B1 | 2/2002 | Bartolutti et al. |
| 6,359,859 B1 | 3/2002 | Brolin et al. |
| 6,368,155 B1 | 4/2002 | Bassler et al. |
| 6,378,111 B1 | 4/2002 | Brenner et al. |
| 6,424,710 B1 | 7/2002 | Bartolutti et al. |
| 6,442,032 B1 | 8/2002 | Linares et al. |
| 6,499,861 B1 | 12/2002 | German et al. |
| 6,516,345 B1 | 2/2003 | Kracht |
| 6,522,737 B1 | 2/2003 | Bartolutti et al. |
| 6,564,258 B1 | 5/2003 | Uniacke |
| 6,574,221 B1 | 6/2003 | Petersen |
| 6,574,586 B1 | 6/2003 | David et al. |
| 6,577,243 B1 | 6/2003 | Dannenmann et al. |
| 6,636,152 B2 | 10/2003 | Schannach et al. |
| 6,684,179 B1 | 1/2004 | David |
| 6,725,177 B2 | 4/2004 | David et al. |
| 6,778,505 B1 | 8/2004 | Bullman et al. |
| 6,784,802 B1 * | 8/2004 | Stanescu ............ G01R 31/045 340/572.1 |
| 6,808,116 B1 | 10/2004 | Eslambolchi et al. |
| 6,847,856 B1 | 1/2005 | Bohannon |
| 6,881,096 B2 | 4/2005 | Brown et al. |
| D510,068 S | 9/2005 | Haggay et al. |
| 6,961,675 B2 | 11/2005 | David |
| 6,968,994 B1 | 11/2005 | Ashwood Smith |
| 6,976,867 B2 | 12/2005 | Navarro et al. |
| 6,993,417 B2 | 1/2006 | Osann, Jr. |
| 7,038,135 B1 | 5/2006 | Chan et al. |
| 7,039,028 B2 | 5/2006 | Chen et al. |
| 7,042,562 B2 | 5/2006 | Kiani et al. |
| 7,046,899 B2 | 5/2006 | Colombo et al. |
| 7,057,105 B2 | 6/2006 | Gottardo et al. |
| 7,075,910 B2 | 7/2006 | Chen et al. |
| 7,077,710 B2 | 7/2006 | Haggay et al. |
| 7,081,808 B2 | 7/2006 | Colombo et al. |
| 7,123,810 B2 | 10/2006 | Parrish |
| 7,126,918 B2 | 10/2006 | Roberts |
| 7,136,936 B2 | 11/2006 | Chan et al. |
| 7,142,536 B1 | 11/2006 | Gossett et al. |
| 7,153,142 B2 | 12/2006 | Shifris et al. |
| 7,159,026 B2 | 1/2007 | Lau et al. |
| 7,160,143 B2 | 1/2007 | David et al. |
| 7,193,422 B2 | 3/2007 | Velleca et al. |
| 7,197,214 B2 | 3/2007 | Elkins, II et al. |
| 7,226,217 B1 | 6/2007 | Benton et al. |
| 7,229,020 B2 | 6/2007 | Goodison et al. |
| 7,234,944 B2 | 6/2007 | Nordin et al. |
| 7,246,746 B2 | 7/2007 | McNamara et al. |
| 7,254,652 B2 | 8/2007 | Anderson et al. |
| 7,266,087 B2 | 9/2007 | Wahl |
| 7,289,334 B2 | 10/2007 | Behrens et al. |
| 7,289,436 B2 | 10/2007 | Schaller et al. |
| 7,297,018 B2 | 11/2007 | Caveney et al. |
| 7,312,715 B2 | 12/2007 | Shalts et al. |
| D559,186 S | 1/2008 | Kelmer |
| 7,315,224 B2 | 1/2008 | Gurovich et al. |
| 7,317,735 B1 | 1/2008 | Ojard |
| 7,328,033 B2 | 2/2008 | Rappaport et al. |
| D564,966 S | 3/2008 | Shifris |
| 7,352,289 B1 | 4/2008 | Harris |
| 7,377,819 B1 | 5/2008 | Cooper et al. |
| 7,382,765 B2 | 6/2008 | Kennedy et al. |
| 7,401,985 B2 | 7/2008 | Aronson et al. |
| 7,406,231 B1 | 7/2008 | Beck et al. |
| D575,743 S | 8/2008 | Shifris et al. |
| 7,411,405 B2 | 8/2008 | Nordin |
| 7,433,363 B2 | 10/2008 | Rosen et al. |
| 7,445,389 B2 | 11/2008 | Aronson |
| 7,453,864 B2 | 11/2008 | Kennedy et al. |
| 7,468,669 B1 | 12/2008 | Beck et al. |
| 7,479,032 B2 | 1/2009 | Hoath |
| 7,483,419 B2 | 1/2009 | Bullman et al. |
| 7,499,616 B2 | 3/2009 | Aronson et al. |
| 7,517,243 B2 | 4/2009 | Caveney et al. |
| 7,540,667 B2 | 6/2009 | Murano |
| 7,547,150 B2 | 6/2009 | Downie et al. |
| 7,551,456 B2 | 6/2009 | Behrens et al. |
| 7,564,795 B2 | 7/2009 | Stephenson et al. |
| 7,586,942 B2 | 9/2009 | Golasky et al. |
| 7,605,707 B2 | 10/2009 | German et al. |
| 7,616,589 B2 | 11/2009 | Nagata et al. |
| 7,617,245 B2 | 11/2009 | De Souza et al. |
| 7,667,574 B2 | 2/2010 | Downie et al. |
| 7,698,156 B2 | 4/2010 | Martucci et al. |
| 7,760,094 B1 | 7/2010 | Kozischek et al. |
| 7,772,975 B2 | 8/2010 | Downie et al. |
| 7,782,202 B2 | 8/2010 | Downie et al. |
| 7,839,266 B2 | 11/2010 | Hoglund et al. |
| 7,855,697 B2 | 12/2010 | Chamarti et al. |
| 7,856,166 B2 | 12/2010 | Biribuze et al. |
| 7,870,242 B2 | 1/2011 | Nguyen |
| 7,965,186 B2 | 6/2011 | Downie et al. |
| 8,000,991 B2 | 8/2011 | Montagut |
| 8,037,173 B2 | 10/2011 | Tuckey et al. |
| 8,050,939 B2 | 11/2011 | Graves et al. |
| 8,075,348 B2 | 12/2011 | Mei et al. |
| 8,092,249 B2 | 1/2012 | German et al. |
| 8,099,311 B2 | 1/2012 | La Vecchia et al. |
| 8,116,434 B2 | 2/2012 | German et al. |
| 8,138,925 B2 | 3/2012 | Downie et al. |
| 8,172,468 B2 | 5/2012 | Jones et al. |
| 8,181,229 B2 | 5/2012 | Macauley |
| 8,203,450 B2 | 6/2012 | German et al. |
| 8,248,208 B2 | 8/2012 | Renfro, Jr. |
| 8,264,355 B2 | 9/2012 | Kozischek et al. |
| 8,264,366 B2 | 9/2012 | Chamarti et al. |
| 8,643,476 B2 * | 2/2014 | Pinn .................. H04Q 1/136 340/10.1 |
| 8,768,738 B2 * | 7/2014 | Jacobs ................ G06Q 10/02 705/7.16 |
| 2001/0001270 A1 | 5/2001 | Williams Vigliaturo |
| 2001/0024360 A1 | 9/2001 | Hirata et al. |
| 2002/0138604 A1 | 9/2002 | Kopelvitz et al. |
| 2003/0046339 A1 | 3/2003 | Ip |
| 2003/0061393 A1 | 3/2003 | Steegmans et al. |
| 2003/0194912 A1 | 10/2003 | Ferentz |
| 2003/0197619 A1 | 10/2003 | Lawrence et al. |
| 2003/0219033 A1 | 11/2003 | Silvester |
| 2004/0024717 A1 | 2/2004 | Sneeringer |
| 2004/0073597 A1 | 4/2004 | Caveney et al. |
| 2005/0071514 A1 | 3/2005 | Anderson et al. |
| 2005/0164548 A1 | 7/2005 | Spears et al. |
| 2005/0186819 A1 | 8/2005 | Velleca et al. |
| 2005/0190768 A1 | 9/2005 | Cutler |
| 2005/0245127 A1 | 11/2005 | Nordin et al. |

(56) References Cited

U.S. PATENT DOCUMENTS

| | | |
|---|---|---|
| 2006/0047800 A1 | 3/2006 | Caveney et al. |
| 2006/0059293 A1 | 3/2006 | Wurzburg et al. |
| 2006/0160395 A1 | 7/2006 | Macauley et al. |
| 2006/0160396 A1 | 7/2006 | Macauley et al. |
| 2006/0179144 A1 | 8/2006 | Nagase |
| 2006/0185887 A1 | 8/2006 | Neujahr |
| 2006/0203715 A1 | 9/2006 | Hunter et al. |
| 2006/0227759 A1 | 10/2006 | Bohm et al. |
| 2006/0235741 A1 | 10/2006 | Deaton et al. |
| 2006/0253561 A1 | 11/2006 | Holmeide et al. |
| 2006/0268507 A1 | 11/2006 | Takahashi |
| 2006/0268747 A1 | 11/2006 | Van Haalen et al. |
| 2006/0282527 A1 | 12/2006 | Chiou et al. |
| 2007/0025306 A1 | 2/2007 | Cox et al. |
| 2007/0058338 A1 | 3/2007 | Lee |
| 2007/0117444 A1 | 5/2007 | Caveney et al. |
| 2007/0153823 A1 | 7/2007 | Wojtowicz |
| 2007/0162954 A1 | 7/2007 | Pela |
| 2007/0230452 A1 | 10/2007 | Hough et al. |
| 2007/0274234 A1 | 11/2007 | Kubota |
| 2008/0049627 A1 | 2/2008 | Nordin |
| 2008/0159738 A1 | 7/2008 | Lavranchuk |
| 2008/0181136 A1 | 7/2008 | Watanabe et al. |
| 2008/0181138 A1 | 7/2008 | Dalberg |
| 2008/0219268 A1 | 9/2008 | Dennison |
| 2008/0265915 A1 | 10/2008 | Clark et al. |
| 2009/0081888 A1 | 3/2009 | Nordin et al. |
| 2009/0100298 A1 | 4/2009 | Lange et al. |
| 2009/0195349 A1 | 8/2009 | Frader-Thompson et al. |
| 2009/0322487 A1 | 12/2009 | Lange et al. |
| 2010/0020722 A1 | 1/2010 | Farkas et al. |
| 2010/0054157 A1 | 3/2010 | Farkas et al. |
| 2010/0120264 A1* | 5/2010 | Caveney ............... H04Q 1/136 439/49 |
| 2010/0205032 A1* | 8/2010 | Nielsen ................. G06Q 10/06 705/7.11 |
| 2010/0210135 A1 | 8/2010 | German et al. |
| 2010/0211664 A1 | 8/2010 | Raza et al. |
| 2010/0211665 A1 | 8/2010 | Raza et al. |
| 2010/0211697 A1 | 8/2010 | Raza |
| 2010/0215049 A1 | 8/2010 | Raza |
| 2010/0238003 A1 | 9/2010 | Chan et al. |
| 2010/0267274 A1 | 10/2010 | McNally et al. |
| 2010/0271961 A1 | 10/2010 | Caveney |
| 2010/0271963 A1 | 10/2010 | Caveney |
| 2011/0244698 A1 | 10/2011 | Jacks et al. |
| 2011/0255611 A1 | 10/2011 | Caveney et al. |
| 2012/0007717 A1 | 1/2012 | Jong |
| 2012/0084108 A1 | 4/2012 | Bohannon et al. |
| 2012/0309211 A1 | 12/2012 | Jacks et al. |
| 2013/0128758 A1 | 5/2013 | Polland |
| 2013/0205579 A1 | 8/2013 | Mather et al. |
| 2013/0207782 A1 | 8/2013 | Mather et al. |
| 2013/0306723 A1 | 11/2013 | Mather et al. |
| 2014/0111346 A1* | 4/2014 | Pinn ....................... H04Q 1/09 340/691.6 |

FOREIGN PATENT DOCUMENTS

| | | |
|---|---|---|
| CN | 1809985 | 7/2006 |
| CN | 1811743 A | 8/2006 |
| CN | 101199161 A | 6/2008 |
| EP | 1569494 | 8/2005 |
| JP | 2001297044 | 10/2001 |
| KR | 102008017170 | 2/2008 |
| WO | 2004105317 | 12/2004 |
| WO | 2011057383 | 5/2011 |

OTHER PUBLICATIONS

Meredith, "Managers Missing Point of Intelligent Patching ", "http://searchdatacenter.techtarget.com/news/article/0,289142,sid80_gci1099991,00.html", Jun. 21, 2005, pp. 12, Publisher: SearchDataCenter.com.

Milligan, "Intelligent Patching Systems Carving Out a 'Large' Niche", "http://www.cablinginstall.com/index/display/article-display/207641/articles/cabling-installation-maintenance/volume-12/issue-7/contents/technology/int", Jul. 1, 2004, pp. 16, vol. 12, No. 7, Publisher: Cabling Installation & Maintenance.

Mirjalily et al., "Best Multiple Spanning Tree in Metro Ethernet Networks", "Computer and Electrical Engineering, 2009. ICEE'09. Second International Conference on", Dec. 28-30, 2009, pp. 117-121, vol. 2, Publisher: IEEE, Published in: Dubai.

Feltgen, "PCT Patent Application PCT/EP2009/009036: Method and Arrangement for Identifying at Least One Object", Dec. 16, 2009, pp. 125, Published in: WO.

"UPnP Device Architecture 1.1", Oct. 15, 2008, pp. 1-272, Publisher: UPnP Forum.

European Patent Office, "International Search Report and Written Opinion", "from PCT Counterpart of U.S. Appl. No. 14/037,871", dated Dec. 19, 2013, pp. 1-10, Published in: EP.

Chinese Patent Office, "First Office Action", "from Foreign Counterpart of U.S. Appl. No. 12/705,497", dated Nov. 2, 2012, pp. 1-34, Published in: CN.

Chinese Patent Office, "Office Action", "from Foreign Counterpart of U.S. Appl. No. 12/705,497", dated Apr. 24, 2013, pp. 1-10, Published in: CN.

European Patent Office, "Extended European Search Report", "from Foreign Counterpart of U.S. Appl. No. 12/705,497", dated Sep. 27, 2012, pp. 1-6, Published in: EP.

Mexican Patent Office, "Office Action", "from Foreign Counterpart of U.S. Appl. No. 12/705,497", dated Oct. 11, 2013, pp. 1-8, Published in: MX.

U.S. Patent and Trademark Office, "Final Office Action", "U.S. Appl. No. 12/705,497", dated Oct. 16, 2012, pp. 1-29.

U.S. Patent and Trademark Office, "Office Action", "U.S. Appl. No. 12/705,497", dated Apr. 17, 2012, pp. 1-31.

The International Bureau of WIPO, "International Preliminary Report on Patentability", "from PCT Application No. PCT/US2010/024181", dated Aug. 25, 2011, pp. 1-7, Published in: CH.

Korean Intellectual Property Office, "International Search Report", "from PCT Application No. PCT/US2010/024181", dated Sep. 28, 2010, pp. 1-10, Published in: KR.

Chinese Patent Office, "First Office Action", "from Foreign Counterpart of U.S. Appl. No. 12/705,501", dated Sep. 5, 2012, pp. 1-24, Published in: CN.

Chinese Patent Office, "Office Action", "from Foreign Counterpart of U.S. Appl. No. 12/705,501", dated Mar. 13, 2013, pp. 1-38, Published in: CN.

State Intellectual Property Office, P.R. China, "Third Office Action", "from Foreign Counterpart of U.S. Appl. No. 12/705,501", dated Jul. 31, 2013, pp. 1-7, Published in: CN.

European Patent Office, "Extended European Search Report", "from Foreign Counterpart of U.S. Appl. No. 12/705,501", dated Sep. 19, 2012, pp. 1-9, Published in: EP.

European Patent Office, "Extended European Search Report", "from Foreign Counterpart of U.S. Appl. No. 12/705,501", dated May 22, 2012, pp. 1-7, Published in: EP.

Mexican Patent Office, "Office Action", "from Foreign Counterpart of U.S. Appl. No. 12/705,501", dated Oct. 11, 2013, pp. 1-11, Published in: MX.

U.S. Patent and Trademark Office, "Office Action", "U.S. Appl. No. 12/705,501", dated Apr. 5, 2013, pp. 1-39.

U.S. Patent and Trademark Office, "Office Action", "from U.S. Appl. No. 12/705,501", dated Sep. 24, 2013, pp. 1-18.

U.S. Patent and Trademark Office, "Restriction Requirement", "U.S. Appl. No. 12/705,501", dated Dec. 14, 2012, pp. 1-6.

The International Bureau of WIPO, "International Preliminary Report on Patentability", "from PCT Application No. PCT/US2010/024184", dated Aug. 25, 2011, pp. 1-7, Published in: CH.

Korean Intellectual Property Office, "International Search Report", "from PCT Application No. PCT/US2010/024184", dated Sep. 27, 2010, pp. 1-10, Published in: KR.

(56) References Cited

OTHER PUBLICATIONS

European Patent Office, "Extended European Search Report", "from Foreign Counterpart of U.S. Appl. No. 12/705,506", dated Oct. 11, 2012, pp. 1-9, Published in: EP.
Mexican Patent Office, "Office Action", "from Foreign Counterpart of U.S. Appl. No. 12/705,506", dated Oct. 11, 2013, pp. 1-7, Published in: MX.
U.S. Patent and Trademark Office, "Final Office Action", "U.S. Appl. No. 12/705,506", dated Dec. 14, 2012, pp. 1-29.
U.S. Patent and Trademark Office, "Office Action", "U.S. Appl. No. 12/705,506", dated Jun. 28, 2012, pp. 1-32.
The International Bureau of WIPO, "International Preliminary Report on Patentability", "from PCTCounterpart of U.S. Appl. No. 12/705,506", dated Aug. 25, 2011, pp. 1-6, Published in: CH.
International Searching Authority, "International Search Report", "from Foreign Counterpart of U.S. Appl. No. 12/705,506", dated Sep. 30, 2010, pp. 1-9, Published in: WO.
Chinese Patent Office, "First Office Action", "from Foreign Counterpart of U.S. Appl. No. 12/705,514", dated Sep. 4, 2012, pp. 1-14, Published in: CN.
Chinese Patent Office, "Office Action", "from Foreign Counterpart of U.S. Appl. No. 12/705,514", dated Mar. 5, 2013, pp. 1-24, Published in: CN.
State Intellectual Property Office, P.R. China, "Third Office Action", "from Foreign Counterpart of U.S. Appl. No. 12/705,514", dated Jun. 24, 2013, pp. 1-18, Published in: CN.
European Patent Office, "Extended European Search Report", "from Foreign Counterpart of U.S. Appl. No. 12/705,514", dated Oct. 11, 2012, pp. 1-6, Published in: EP.
Mexican Patent Office, "Office Action", "from Foreign Counterpart of U.S. Appl. No. 12/705,514", pp. 1-5, Published in: MX.
U.S. Patent and Trademark Office, "Advisory Action", "U.S. Appl. No. 12/705,514", dated Nov. 14, 2012, pp. 1-4.
U.S. Patent and Trademark Office, "Final Office Action", "U.S. Appl. No. 12/705,514", dated Aug. 23, 2012, pp. 1-20.
U.S. Patent and Trademark Office, "Office Action", "U.S. Appl. No. 12/705,514", dated Mar. 15, 2012, pp. 1-25.
U.S. Patent and Trademark Office, "Office Action", "from U.S. Appl. No. 12/705,514", dated Sep. 25, 2013, pp. 1-45, Published in: US.
U.S. Patent and Trademark Office, "Pre-Appeal Brief Decision", "U.S. Appl. No. 12/705,514", dated Dec. 18, 2012, pp. 1-2.
The International Bureau of WIPO, "International Preliminary Report on Patentability", "from PCT Counterpart of U.S. Appl. No. 12/705,514", dated Aug. 25, 2011, pp. 1-6, Published in: CH.
Korean Intellectual Property Office, "International Search Report", "from PCT Application No. PCT/US2010/024188", dated Sep. 28, 2010, pp. 1-9, Published in: KR.
U.S. Patent and Trademark Office, "Advisory Action", "from U.S. Appl. No. 13/248,413", dated Sep. 30, 2013, pp. 1-3.
U.S. Patent and Trademark Office, "Final Office Action", "from U.S. Appl. No. 13/248,413", dated Jul. 18, 2013, pp. 1-15.
U.S. Patent and Trademark Office, "Office Action", "from U.S. Appl. No. 13/248,413", dated Dec. 24, 2012, pp. 1-12, Published in: US.
International Searching Authority, "International Search Report", "from Foreign Counterpart of U.S. Application No.", dated Feb. 20, 2013, pp. 1-11.
European Patent Office, "International Search Report", "from PCT Application Serial No. PCT/EP2013/000441", dated Aug. 21, 2013, pp. 1-15, Published in: WO.
Figueira et al., "10GE WAN PHY: Physical Medium Attachment (PMA)", "IEEE 802.3 Meeting, Albuquerque", Mar. 2000, pp. 1-42.
Dimitrov et al. , "Embedded Internet Based System", 2008, pp. 103-107.
"Embedded Ethernet System Design Guide", Aug. 2008, Publisher: Silicon Laboratories.
"The Ethersmart Wildcard", "http://www.mosaic-industries.com/Products/WildCards/ETHx/", 2008, Publisher: Mosaic Industries, Inc.
Farkas et al. , "Automatic Discovery of Physical Topology in Ethernet Networks", "Advance Information Networking and Applications, 2008. AINA 2008. 22nd International Conference on", Mar. 25-28, 2008, pp. 848-854, Publisher: IEEE, Published in: Okinawa.
Feuzeu et al. , "A New Scheme for Interconnecting LANS With Label Switching Bridges", "Local Computer Networks, 2005. 30th Anniversary. The IEEE Conference on", Nov. 17, 2005, pp. 303-311, Publisher: IEEE, Published in: Sydney.
"IntelliMAC", May 2003, pp. 1-6, Publisher: Nordx/CDT.
Kang et al. , "Design and Implementation of Network Management System for Power Line Communication Network ", "IEEE International Symposium on Power Line Communications and its Applications (ISPLC 2007)", Mar. 28, 2007, pp. 23-28, Publisher: IEEE.

\* cited by examiner

| Work Order List | | | |
|---|---|---|---|
| All \| Current \| Future \| Overdue \| Closed | | | |
| ID | Title | Start Date | End Date |
| 29876 | Comms patching Friday 13 | 2012-07-12 11:26:26 | 2012-07-13 |
| 29877 | Replace Cisco Switch | 2012-07-12 11:27:00 | 2012-07-13 |
| 29879 | Label cabinets | 2012-07-12 11:27:11 | 2012-07-13 |
| 29880 | Patch New Desk | 2012-07-12 11:27:20 | 2012-07-13 |
| 29881 | Catalogue Comms room | 2012-07-12 11:27:25 | 2012-07-13 |

FIG. 3B

| Event Viewer | | | | |
|---|---|---|---|---|
| ID | Date ⌄ | Event Group | Event Type | Description |
| 283 | 2012-07-26 16:05:47:979 | Session | Login Failure | User[f.demo] with roles [ADMIN,CLIENT_A( |
| 282 | 2012-07-26 16:04:40:198 | Session | Login Failure | User[f.demo] with roles [ADMIN,CLIENT_A( |
| 281 | 2012-07-25 11:23:24:081 | Session | Login Failure | User[f.demo] with roles [ADMIN,CLIENT_A( |
| 280 | 2012-07-23 10:14:19:815 | Session | Login Success | User[administrator] with roles [ADMIN,SUP |
| 279 | 2012-07-20 15:59:42:767 | Session | Logout | User[administrator] with roles [ADMIN,SUP |
| 278 | 2012-07-20 14:14:52:275 | Session | Login Failure | User[administrator] with roles [ADMIN,SUP |
| 343 Results | \|<   <   >   >\| | | | Page 11/58 |

FIG. 3J

MOBILE APPLICATION FOR ASSISTING A TECHNICIAN IN CARRYING OUT AN ELECTRONIC WORK ORDER

CROSS-REFERENCE TO RELATED APPLICATION

This application claims the benefit of U.S. Provisional Patent Application Ser. No. 61/706,460, filed on Sep. 27, 2012, which is hereby incorporated herein by reference.

BACKGROUND

Telecommunications networks typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord or cable" cross connects the two together. In other words, a single logical communication link is often implemented using several segments of physical communication media.

Various types of physical layer management (PLM) systems are used to facilitate the adding, changing, and removing of cross connections at a particular patch panel or a set of patch panels at a given location. Generally, such PLM systems include functionality to track what is connected to each port of a patch panel, trace connections that are made using a patch panel, and provide visual indications to a technician at a patch panel (for example, by illuminating an LED that is associated with the patch panel or a port thereof).

One exemplary type of PLM system makes use of an Electrically Erasable Programmable Read-Only Memory (EEPROM) or other storage device that is integrated with or attached to a connector on a cable, fiber, or other segment of communication media. The storage device is used to store information about the connector or cable along with other information. The port (or other connector) into which the associated connector is inserted is configured to read the information stored in the EEPROM or other storage device when the connector is inserted that port.

Another type of PLM system makes of so-called "ninth wire" technology. Ninth wire technology makes use of special cables that include an extra conductor or signal path (also referred to here as the "ninth wire" conductor or signal path) that is used for determining which port each end of the cables is inserted into.

Another type of PLM system makes use of radio frequency identification (RFID) tags and readers. With this type of RFID PLM system, an RFID tag is attached to or integrated with a connector on a cable, fiber, or other segment of communication media. The RFID tag is used to store information about the connector or segment of communication media along with other information. The RFID tag can be read after the associated connector is inserted into a corresponding jack or other port using an RFID reader.

PLM systems typically include an application that enables electronic work orders to be constructed that specify one or more steps that are to be carried out by a technician at a particular location. For example, an electronic work order can indicate that a set of connections should be added, removed, and/or changed. For steps that involve adding, removing, and/or changing connections at a patch panel or other device that includes PLM technology, the proper performance of the steps can be verified using the PLM technology (for example, by using the PLM technology to confirm that the specified connection has been added, removed, and/or changed).

Electronic work orders can also includes steps that involve something other than adding, removing, and/or changing connections at a patch panel or other device that includes PLM technology. For example, an electronic work order can indicate that a technician should use a cable in a particular way (for example, routing the cable around specified cable guides). However, PLM systems are typically not able to automatically verify that the technician has properly carried out these types of steps.

Also, in the event that a technician finds it necessary to perform a step in a manner that deviates from what is specified in the electronic work order, the technician typically will manually enter information about the deviation into the PLM system. However, the PLM system is typically not able to acquire information that can be used to confirm or document such deviations, and either must rely on the data entered by the technician or have another individual travel to the work location in order to visually verify the information entered by the technician.

Furthermore, electronic work orders typically describe the steps to be performed using text.

Moreover, conventional electronic work order systems typically do not provide a convenient mechanism for a technician to illuminate (or otherwise visually actuate) light emitting diodes (LEDs) associated with a port or patch panel that is affected by a step in an electronic work order. Such conventional systems also typically do not provide a convenient mechanism for the technician to cause such LEDs to no longer be illuminated (or otherwise visually actuated).

SUMMARY

One embodiment is directed to a method of performing the steps of a work order. The method comprises generating an electronic work order. The electronic work order comprises a set of steps. The method further comprises communicating the electronic work order to a mobile application executing on a smartphone, using a camera included in the smartphone to take a picture related to the performance of at least one step associated with the electronic work order, associating the picture with the at least one step, and communicating the picture to an entity for use in documenting the at least one step.

Another embodiment is directed to a method of performing the steps of a work order. The method comprises generating an electronic work order. The electronic work order comprises a set of steps. The method further comprises communicating the electronic work order to a mobile application executing on a smartphone, receiving a user input indicating that a visual indicator associated with at least one step included in the electronic work order should be visually actuated, and sending a message from the mobile application executing on the smartphone to an external entity. The external entity is configured to visually actuate the visual indicator in response to receiving the message.

Another embodiment is directed to a program product for implementing a mobile application on a smartphone that is tangibly stored on a non-transitory storage medium. The program product comprises instructions operable to cause at least one programmable processor in the smartphone to receive an electronic work order comprising a set of steps, use a camera included in the smartphone to take a picture related to the performance of at least one step associated with the electronic work order, associate the picture with the at least one step, and communicate the picture to an entity for use in documenting the at least one step.

Another embodiment is directed to a program product for implementing a mobile application on a smartphone that is tangibly stored on a non-transitory storage medium. The program product comprises instructions operable to cause at least one programmable processor in the smartphone to receive an electronic work order comprising a set of steps, receive a user input indicating that a visual indicator associated with at least one step included in the electronic work order should be visually actuated, and send a message from the mobile application executing on the smartphone to an external entity. The external entity is configured to visually actuate the visual indicator in response to receiving the message.

Another embodiment is directed to a system comprising an aggregation point configured to receive and store information about connections made in a communication network. The system further comprises an electronic work order entity configured to generate an electronic work order. The electronic work order comprises a set of steps. The system further comprises a smartphone configured to receive the electronic work order using a mobile application executing on a smartphone. The smartphone comprises a camera. The mobile application is configured to: take a picture related to the performance of at least one step associated with the electronic work order, associate the picture with the at least one step, and communicate the picture to at least one of the aggregation point and the electronic work order entity for use in documenting the at least one step.

Another embodiment is directed to a system comprising an aggregation point configured to receive and store information about connections made in a communication network. The system further comprises an electronic work order entity configured to generate an electronic work order. The electronic work order comprises a set of steps. The system further comprises a smartphone configured to receive the electronic work order using a mobile application executing on a smartphone. The mobile application is configured to: receive a user input indicating that a visual indicator associated with at least one step included in the electronic work order should be visually actuated and send a message from the mobile application executing on the smartphone to an external entity. The external entity is configured to visually actuate the visual indicator in response to receiving the message.

DRAWINGS

FIGS. 3A-3K are example screenshots of one exemplary embodiment of a mobile application and electronic work order application that can be used in the system of FIG. 1.

DETAILED DESCRIPTION

Figure 1:
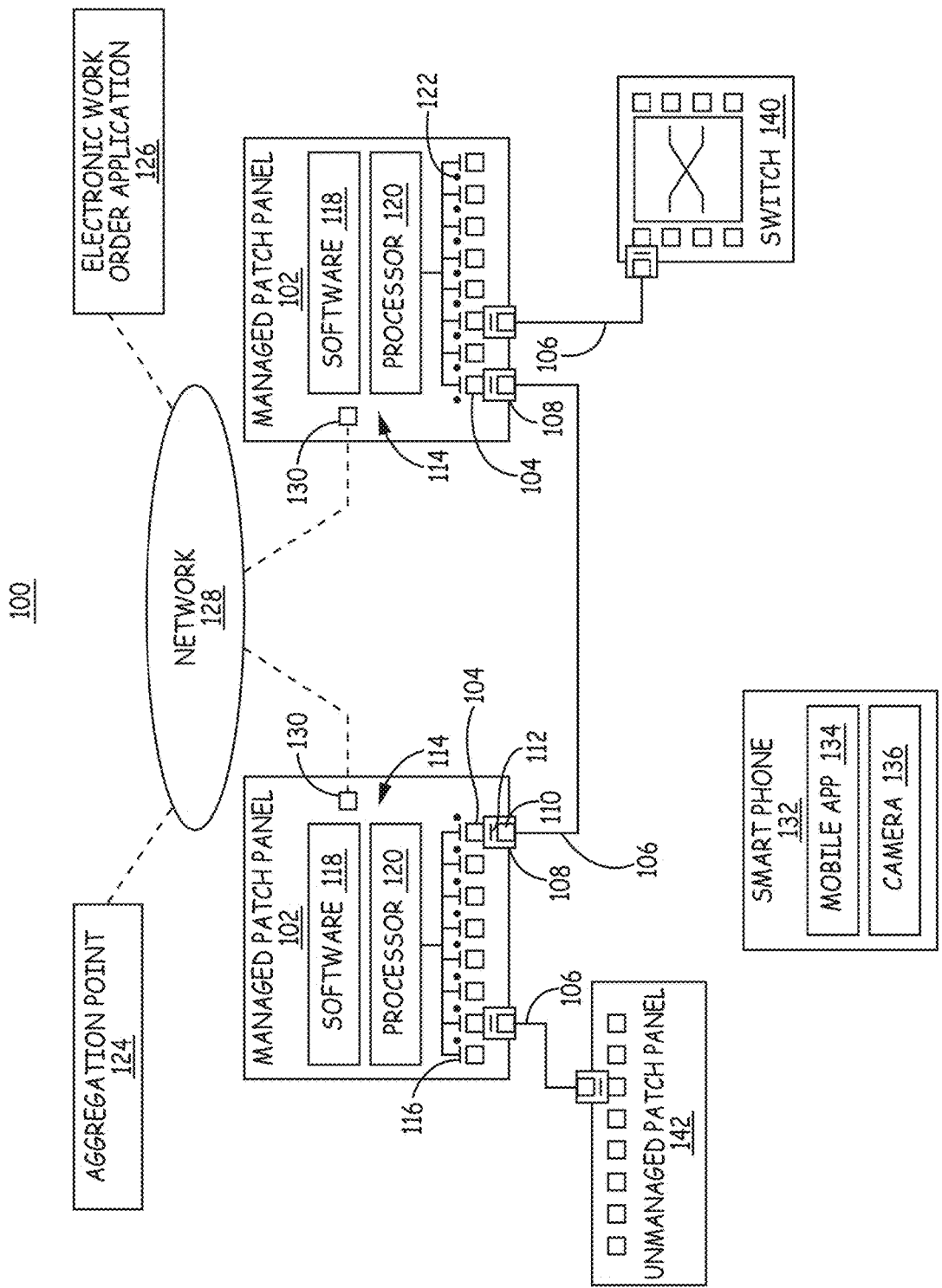
FIG. 1 is a block diagram of one exemplary embodiment of a physical layer management (PLM) system that can be used with the mobile application technology described here.

FIG. 1 is a block diagram of one exemplary embodiment of a physical layer management (PLM) system 100 that can be used with the mobile application technology described below. However, it is to be understood that the mobile application technology described below can be implemented using other PLM systems.

The particular PLM system 100 shown in FIG. 1 is described here as being implemented using EEPROM-based PLM technology (for example, the QUAREO™ PLM technology that is commercially available from TE Connectivity) with patch panels 102 that are configured to automatically obtain and track information about connections made at the ports 104 of the patch panels 102. However, it is to be understood that other embodiments can be implemented in other ways (for example, using RFID PLM technology or ninth-wire PLM technology). Patch panels, devices, and media that are configured to automatically obtain and/or track information about connections made using those devices and media are referred to here as "managed" devices and media.

Moreover, the mobile application technology described below can be implemented using devices and media that do not include functionality for automatically obtaining and tracking information about connections made using those devices and media. Such devices and media are also referred to here as "unmanaged" devices and media.

In this example, connections are made at the patch panels 102 using patch cables 106 that are terminated at each end with connectors 108 (for example, CAT-5 or CAT-6 patch cables that are terminated at each end with RJ-45 connectors). In this example, each connector 108 includes a storage device 110 (such as an Electrically Erasable Programmable Read-Only Memory (EEPROM)) in which information about the connector 108 and/or patch cable 106 is stored. Each connector 108 also includes a storage-device interface 112 via which information can be read from the associated storage device 110 when the connector 108 is inserted into a port 104 of a patch panel 102. In other embodiments, other types of devices, connectors, cabling, and media can be used (for example, fiber optic devices, cabling, and connectors).

Examples of storage device technology suitable for use in the example shown in FIG. 1 are described in the following United States patent applications, all of which are hereby incorporated herein by reference: U.S. Provisional Patent Application Ser. No. 61/252,964, filed on Oct. 19, 2009, titled "ELECTRICAL PLUG FOR MANAGED CONNECTIVITY"; U.S. Provisional Patent Application Ser. No. 61/253,208, filed on Oct. 20, 2009, titled "ELECTRICAL PLUG FOR MANAGED CONNECTIVITY"; U.S. patent application Ser. No. 12/907,724, filed on Oct. 19, 2010, titled "MANAGED ELECTRICAL CONNECTIVITY SYSTEMS"; U.S. Provisional Patent Application Ser. No. 61/303,948, filed on Feb. 12, 2010, titled "PANEL INCLUDING BLADE FEATURE FOR MANAGED CONNECTIVITY"; U.S. Provisional Patent Application Ser. No. 61/413,844, filed on Nov. 15, 2010, titled "COMMUNICATIONS BLADED PANEL SYSTEMS"; U.S. Provisional Patent Application Ser. No. 61/439,693, filed on Feb. 4, 2011, titled "COMMUNICATIONS BLADED PANEL SYSTEMS"; U.S. patent application Ser. No. 13/025,730, filed on Feb. 11, 2011, titled "COMMUNICATIONS BLADED PANEL SYSTEMS"; U.S. patent application Ser. No. 13/025,737, filed on Feb. 11, 2011, titled "COMMUNICATIONS BLADED PANEL SYSTEMS"; U.S. patent application Ser. No. 13/025,743, filed on Feb. 11, 2011, titled "COMMUNICATIONS BLADED PANEL SYSTEMS"; U.S. patent application Ser. No. 13/025,750, filed on Feb. 11, 2011, titled "COMMUNICATIONS BLADED PANEL SYSTEMS"; U.S. Provisional Patent Application Ser. No. 61/303,961; filed on Feb. 12, 2010, titled "Fiber Plug And Adapter For Managed Connectivity"; U.S. Provisional Patent Application Ser. No. 61/413,828, filed on Nov. 15, 2010, titled "Fiber Plugs And Adapters For Managed Connectivity"; U.S. Provisional Patent Application Ser. No. 61/437,504, filed on Jan. 28, 2011, titled "Fiber Plugs And Adapters For Managed Connectivity"; U.S. patent application Ser. No. 13/025,784, filed on Feb. 11, 2011, titled "Managed Fiber Connectivity Systems"; U.S. patent application Ser. No. 13/025,788, filed on Feb. 11, 2011, titled "Managed Fiber Connectivity Systems"; U.S. patent application Ser. No. 13/025,797, filed on Feb. 11, 2011, titled "Managed Fiber Connectivity Systems"; U.S. patent application Ser. No. 13/025,841, filed on Feb. 11, 2011, titled "Managed Fiber Connectivity Systems"; U.S. Provisional Patent Application Ser. No. 61/413,856, filed on Nov. 15, 2010, titled "CABLE MANAGEMENT IN RACK SYSTEMS"; U.S. Provisional Patent Application Ser. No. 61/466,696, filed on Mar. 23, 2011, titled "CABLE MANAGEMENT IN RACK SYSTEMS"; U.S. Provisional Patent Application Ser. No. 61/252,395, filed on Oct. 16, 2009, titled "MANAGED CONNECTIVITY IN ELECTRICAL SYSTEMS"; U.S. patent application Ser. No. 12/905,689, filed on Oct. 15, 2010, titled "MANAGED CONNECTIVITY IN ELECTRICAL SYSTEMS"; U.S. Provisional Patent Application Ser. No. 61/252,386, filed on Oct. 16, 2009, titled "MANAGED CONNECTIVITY IN FIBER OPTIC SYSTEMS"; U.S. patent application Ser. No. 12/905,658, filed on Oct. 15, 2010, titled "MANAGED CONNECTIVITY IN FIBER OPTIC SYSTEMS".

As noted above, in the exemplary embodiment shown in FIG. 1, the system 100 comprises one or more managed patch panels 102. Each managed patch panel 102 comprises a plurality of ports 104. Each port 104 is associated with a respective jack on the front face of the managed patch panel 102 into which a connector 108 of a patch cable 106 can be inserted. Each port 104 is also associated with a respective rear termination point (not shown) at which a horizontal run of cable can be terminated. Each port 104 is configured to communicatively couple the jack associated with that port 104 (and any patch cable 106 inserted therein) to the respective termination point (and any horizontal run of cable terminated thereat). In this way, a patch cable 106 inserted into the front jack of the port 104 can be connected to the corresponding horizontal run of cabling terminated at the corresponding rear termination point.

As noted above, each of the managed patch panels 102 in the examples described here includes physical layer management (PLM) functionality 114 that is configured to automatically obtain information about connections that are made using the ports 104 of that panel 102. In the example shown in FIG. 1, each of the managed patch panels 102 includes storage-device interfaces 116. Each of the ports 104 of the managed patch panels 102 is configured to include (or otherwise be associated with) a respective storage-device interface 116. The storage-device interface 116 of each port 104 is configured to mate, and inter-operate, with a corresponding storage-device interface 112 used in a connector 108 attached to an end of a patch cable 106 that is attached to a port 104 of the managed patch panel 102. Software 118 executing on a programmable processor (such as a controller) 120 associated with each patch panel 108 is able to read and write data from and to the storage device 110 associated with any connector 108 that is connected to a given port 104 using that port's storage-device interface 112. The software 118 and programmable processor 120 can be implemented in the manner described in the aforementioned US provisional patent applications and US non-provisional patent applications.

More specifically, when a connector 108 attached to an end of a patch cable 106 is inserted into the front jack of one of the ports 104 of a managed patch panel 102, the software 118 associated with that port 104 uses the storage-device interface 116 for that port 104 to detect that the connector 108 has been inserted and to read the information stored in the storage device 110 integrated into that connector 108. The software 118 then communicates at least a portion of that information to an aggregation point 124 (described below).

In this example, the PLM functionality 114 in each patch panel 102 includes one or more light emitting diodes (LEDs) (or other visual indicators) 122 that are associated with each port 104 of the managed patch panel 102. Each LED 122 is coupled to the programmable processor 120 in the patch panel 102 so that the software 118 executing on that programmable processor 120 can actuate the LEDs 122 (for example, by turning the LEDs 112 on or off or flashing or changing the color of the LEDs 112).

In the example shown in FIG. 1, the system 100 further comprises an aggregation point 124 and an electronic work order application 126. The aggregation point 124, electronic work order application 126, and managed patch panels 102 communicate with one another over a network 128. The computers on which the aggregation point 124 and electronic work order application 126 are implemented include an appropriate network interface to communicatively couple those computers to the network 128. In the example shown in FIG. 1, the programmable processors 120 in the managed patch panels 102 are communicatively coupled to the network 128 by including a respective "management" or "non-service" port 129 that is separate from the "service" ports 104. However, the programmable processors 120 in the managed patch panels 102 can be communicatively coupled to the network 128 using one or more of the "service" ports 104.

In one embodiment, the network 128 comprises an INTERNET PROTOCOL network. The network 128 can be implemented using one or more of a local area network (LAN), a wide area network (WAN), the INTERNET, a virtual local area network (VLAN), and a virtual private network (VPN), an enterprise network, and a telecommunication service provider network. Moreover, the managed patch panels 102 can be a part of the equipment used to implement the network 128.

The electronic work order application 126 is typically implemented in software that runs on a computer that is coupled to the network 128. In one embodiment, the electronic work order application 126 is implemented as software that runs on a server (or other computer).

The aggregation point 124 is typically implemented as software that runs on a computer that is coupled to the network 128. The electronic work order application 126 and the aggregation point 124 can run on the same computer and/or can be implemented as a part of the same software.

The aggregation point 124 is configured to receive physical layer information pertaining to various devices and media used to implement the physical layer in the network 128 (not just the patch cables 106). The physical layer information (PLI) includes information about various devices in the network 128 (for example, information about the patch panels 102) (also referred to here as "device information") as well as information about any segments of physical communication media attached to the ports of those devices (also referred to here as "media information"). The device information includes, for example, an identifier for each device, a type identifier that identifies the device's type, and port information that includes information about the device's ports. The media information includes information that is read from storage devices that are attached to various segments of physical communication media.

Examples of media information that can be stored in such storage devices include, without limitation, an identifier that uniquely identifies that particular segment of physical communication media (similar to an ETHERNET Media Access Control (MAC) address but associated with the physical communication media and/or connector attached to the physical communication media), a part number, a plug or other connector type, a cable or fiber type and length, a serial number, a cable polarity, a date of manufacture, a manufacturing lot number, information about one or more visual attributes of physical communication media or a connector attached to the physical communication media (such as information about the color or shape of the physical communication media or connector or an image of the physical communication media or connector), and other information used by an Enterprise Resource Planning (ERP) system or inventory control system. In other embodiments, alternate or additional data is stored in such storage devices. For example, testing, media quality, or performance information can be stored in such storage devices. The testing, media quality, or performance information, for example, can be the results of testing that is performed when a particular segment of media is manufactured or installed.

The media information can also include information about physical communication media that does not have any storage devices attached to it. This latter type of media information can be manually supplied to the aggregation point 124.

The aggregation point 124 includes a database or other data store (not shown) for storing the physical layer information provided to it. The aggregation point 124 also includes functionality that provides an interface for external devices or entities to access the physical layer information maintained by the aggregation point 124. This access can include retrieving information from the aggregation point 124 as well as supplying information to the aggregation point 124. In this example, the aggregation point 124 is implemented as "middleware" that is able to provide such external devices and entities with transparent and convenient access to the PLI maintained by the aggregation point 124. Because the aggregation point 124 aggregates PLI from the relevant devices in the network 128 and provides external devices and entities with access to such PLI, the external devices and entities do not need to individually interact with all of the devices in the network 128 that provide PLI, nor do such devices need to have the capacity to respond to requests from such external devices and entities.

The aggregation point 124, in this example, implements an application programming interface (API) by which application-layer functionality can gain access to the physical layer information maintained by the aggregation point 124 using a software development kit (SDK) that describes and documents the API.

More information about physical layer information and the aggregation point 124 can be found in U.S. Provisional Patent Application Ser. No. 61/152,624, filed on Feb. 13, 2009, titled "MANAGED CONNECTIVITY SYSTEMS AND METHODS" and U.S. patent application Ser. No. 12/705,497, filed on Feb. 12, 2010, titled "AGGREGATION OF PHYSICAL LAYER INFORMATION RELATED TO A NETWORK", both of which are hereby incorporated herein by reference.

In this example, the electronic work application 126 is used to construct electronic work orders. As noted above, each electronic work specifies one or more steps that are to be carried out by a technician at a particular location. For example, an electronic work order can indicate that one or more connections implemented using the ports 104 of the patch panels 102 should be added, removed, and/or changed. For steps that involve adding, removing, and/or changing connections made at the ports 104 of the patch panels 102, the information that is read from the associated storage devices 110 by the PLM functionality 114 in the patch panels 102 and communicated to the aggregation point 124 can be used by the electronic work order application 126 to verify that the specified connection has been added, removed, and/or changed correctly.

As noted above, electronic work orders can also includes steps that involve something other than adding, removing, and/or changing connections made using the ports 104 of a managed patch panel 102. For example, an electronic work order can indicate that a technician should route a cable in a particular way (for example, routing the cable around specified cable guides).

Also, the LEDs 122 associated with the ports 104 of the managed patch panels 102 can be actuated in order to guide a technician in carrying out the steps of electronic work orders.

In this example, each electronic work order is communicated to a smartphone 132 (or similar device) that is carried by a technician that has been assigned to carry out that electronic work order. In this example, the smartphone 132 is configured to execute a mobile application 134. The mobile application is configured to communicate with the electronic work order application 126 and the aggregation point 124 and to receive the electronic work orders. This mobile application 134 is also referred to here as the "electronic work order mobile application" 134 or the "PLM mobile application" 134. The mobile application 134 comprises program instructions that are stored (or otherwise embodied) on or in an appropriate non-transitory storage medium or media from which at least a portion of the program instructions are read by at least one programmable processor included in the smartphone 132 for execution thereby.

The electronic work order can be communicated wirelessly to the smartphone 132 over the Internet (for example, via a cellular or wireless local area network to which the smartphone 132 is wirelessly connected). The electronic work order can also be communicated to the smartphone 132 in other ways (for example, using a wired connection with the smartphone 132).

In this example, the smartphone 132 includes a camera 136.

A technician can use the mobile application 134 executing on the smartphone 132 to access an electronic work order and to view information about the steps of each electronic work order on the smartphone's display.

The technician can use the mobile application 134 to carry out the steps specified in the electronic work orders assigned to the technician and to mark them as "done". The technician can use the mobile application 134 to perform general, connect, and disconnect work order steps. As noted above, the mobile application 134 can be used to carry out steps that involve patch (or other cables) and patch panels (or other devices) that include PLM functionality (such cables and devices are also referred to here as "managed" cables and devices and such steps are also referred to here as "managed steps").

The mobile application 134 can also be used to carry out steps that involve patch cables (or other cables) and patch panels (or other devices) that do not include PLM functionality (such cables and devices are also referred to here as "unmanaged" cables and devices and such steps are also referred to here as "unmanaged steps"). In the example shown in FIG. 1, the unmanaged devices include a switch 140 and an unmanaged patch panel 142, both of which do not include any PLM functionality.

Also, the mobile application 134 is configured to capture and display photos from the camera 136 in the smartphone 132 in order to document a work order step and to communicate the photos back to the electronic work order application 126 and/or aggregation point 124 for use in documenting and verifying that the technician has properly carried out that step. The mobile application 134 is also configured to enable a technician to enter comments about work order steps that have been carried out. These last two features of the mobile application 134 can also be used in the event that a technician finds it necessary to perform a step in a manner that deviates from what is specified in the electronic work order. These features can be used to document the rationale and the nature of the deviation. For example, where a step of a work order indicates that a particular length of cable should be used but one is not available, the technician can use a cable having a different length and enter a comment explaining why this was done and take a picture of the cable that was used.

These two features can also be used to provide information about general and unmanaged steps that are performed. For example, where a step specifies that a cable be routed in a particular way, after the technician has routed the cable in the manner specified in the step, the technician can use the mobile application 134 to take a picture of the properly routed cable using the smartphone's camera 136. The mobile application 134 is configured to associate the picture with that step of the electronic work order. The technician can also enter a comment about how the cable was routed. The mobile application 134 communicates the captured photo and comment back to the electronic work order application 126 and/or aggregation point 124, where the captured photo and comment can be used to document and verify that step.

The mobile application 134 is also configured to display events and alarms for the technician. The mobile application 134 can be configured to obtain the alarms and events from the electronic work order application 126 and/or the aggregation point 124.

Figure 2:
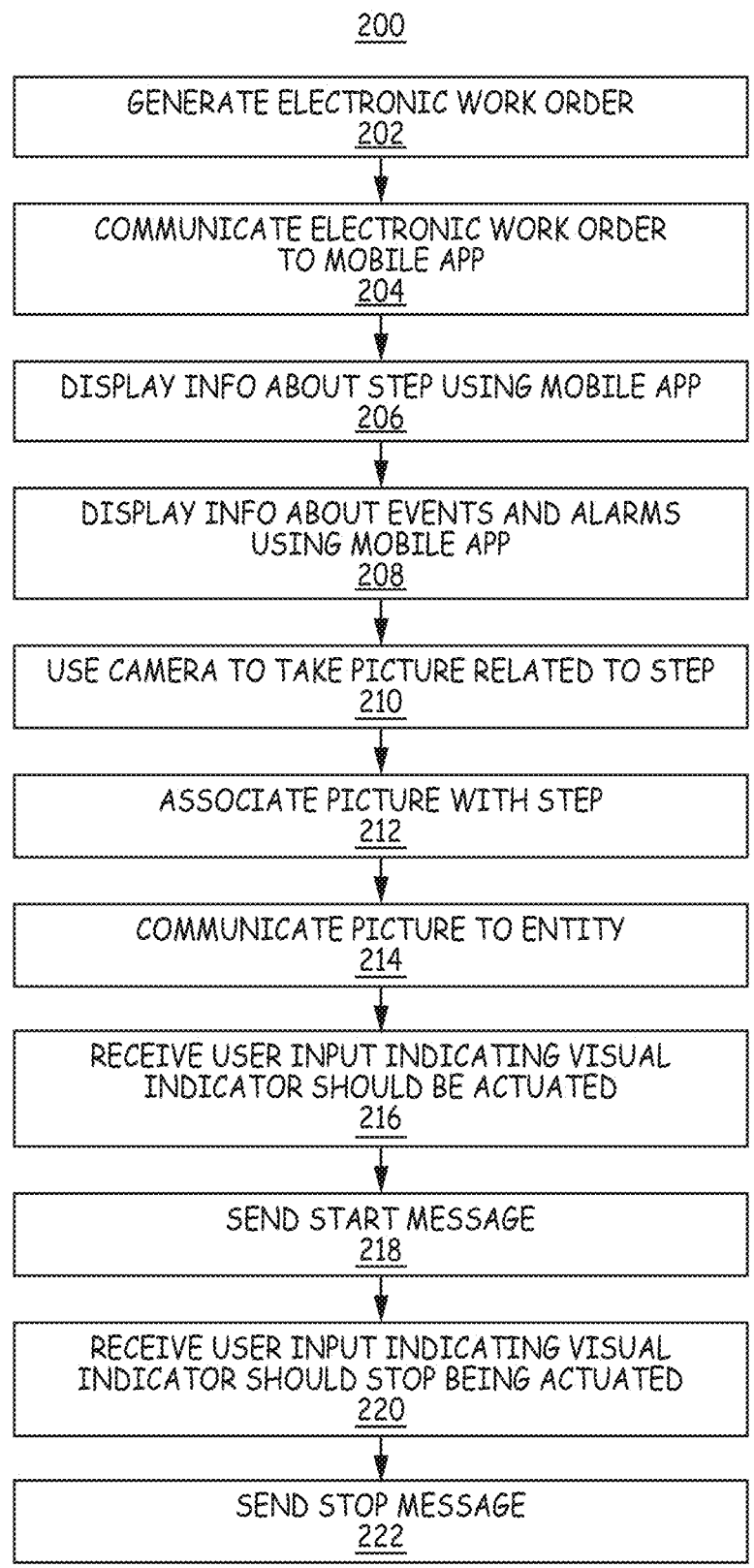
FIG. 2 is a flow diagram showing one exemplary embodiment of a method of performing the steps of an electronic work using the mobile application shown in FIG. 1.

FIG. 2 is a flow diagram showing one exemplary embodiment of a method 200 of performing the steps of an electronic work using the mobile application 134 described above in connection with FIG. 1. The example shown in FIG. 2 is described here as being implemented using the system 100 shown in FIG. 1, though it is to be understood that other embodiments can be implemented in other ways. Moreover, the blocks of the flow diagram shown in FIG. 2 have been arranged for ease of explanation; however, it is to be understood that this arrangement is merely exemplary, and it should be recognized that the processing associated with method 200 (and the blocks shown in FIG. 2) can occur in any order (for example, using standard event-driven programming techniques).

Method 200 comprises generating an electronic work order (block 202). As noted above, each electronic work order comprises a set of steps of the type described above in connection with FIG. 1. In this example, the electronic work order application 126 is used to create the electronic work order. In this example, method 200 further comprises communicating the electronic work order to a mobile application 134 executing on a smartphone 132 (block 204). In this example, the electronic work order can be wirelessly communicated from the electronic work order application 126, for example, using a cellular or wireless local area network communication link, or can be communicated from the electronic work order application 126 using a wired connection to the Internet or a local area network or a wired direct connection to the electronic work order application 126.

Method 200 further comprise displaying information about one or more of the steps associated with the electronic work order using the mobile application 134 executing on the smartphone 132 (block 206) and displaying information about events and alarms using the mobile application 134 executing on the smartphone 132 (block 208). In this example, either of these actions can be requested by the technician using the user interface implemented by the mobile application 134. The information that is displayed using the mobile application 134 can include textual and visual information (pictures). Also, in this example, the event and alarm information can be communicated to the mobile application 134 from the aggregation point 124 and/or the electronic work order application 126. In this way, the mobile application 134 provides the technician with a convenient way to see such information while on-site and performing the steps of an electronic work order.

Method 200 further comprises using a camera 136 included in the smartphone 132 to take a picture related to the performance of at least one step included in the electronic work order (block 210) and associating the picture with the at least one step (block 212). In this example, the mobile application 134 is configured to do this.

Method 200 further comprises communicating the picture to an entity for use in documenting the at least one step (block 214). In this example, the mobile application 134 is configured to communicate the picture to at least one of the aggregation point 124 and the electronic work order application 126 for use in documenting the step the picture is associated with.

Such a picture can be taken in order to provide confirmation that a particular step in the electronic work order has been performed in the manner specified in the electronic work order. This is especially usual for electronic work orders that include steps that involve something other than adding, removing, and/or changing connections at a managed patch panel or other managed device. For example, a step in an electronic work order can indicate that a technician should use a cable in a particular way (for example, routing the cable around specified cable guides). After performing such a step, and then using the mobile application 134 to take a picture of the cable, associate the picture with that step, and then communicate that picture to the aggregation point 124 or the electronic work order application 126. Then, a manager can view the picture in order to confirm that the cable was routed as directed in the electronic work order.

Such a picture can also be taken in the event that a technician finds it necessary to perform a step in an electronic work order in a manner that deviates from what is specified in the electronic work order. For example, where a step in an electronic work order specifies that a particular length of cable is to be used to make a particular connection but a cable of that length is not available, the technician can take a picture of the cable that is actually used (in addition to using the mobile application 134 to enter a text comment that explains the rationale for the deviation). The mobile application 134 can be used to associate the picture with that step and then communicate that picture to the aggregation point 124 or the electronic work order application 126. The picture can be used for documentation purposes and, if the connection is made using an unmanaged patch panel or other unmanaged device, to confirm that a cable of the length described in the technician's comment was indeed used to make the connection.

Method 200 further comprises receiving a user input indicating that a visual indicator associated with at least one step included in the electronic work order should be visually actuated (block 216) and, in response to that, sending a message from the mobile application 134 executing on the smartphone 132 to an external entity, where the external entity is configured to visually actuate the visual indicator in response to receiving the message (block 218). In this example, the visual indicator comprises one or more light emitting diodes 122 that are associated with a port 104 or patch panel 102 that is affected by the current step of the work order. The LEDs 122 can be visually actuated, for example, by illuminating the LED 122, flashing the LED 122, and/or changing the color of the LED 122.

In this example, the mobile application 134 executing on the smartphone 132 is configured to display on the screen of the smartphone 132 a suitable user interface element that a technician can interact with in order to indicate that the technician would like the one or more LEDs 122 associated with the port 104 (or patch panel 102) involved with the current step of the work order to be illuminated (or otherwise visually actuated). In this example, when the mobile application 134 receives such user input from the technician, the mobile application 134 sends a message to the aggregation point 124 (the external entity in this example) indicating that the aggregation point 124 should illuminate or otherwise visually actuate the relevant LEDs 122. The aggregation point 124 does this in response to receiving such a message.

Method 200 further comprises receiving a user input indicating that the visual indicator associated with the current step should stop being visually actuated (block 220) and, in response to that, sending a stop message from the mobile application 134 executing on the smartphone to the external entity, where the external entity is configured to stop visually actuating the visual indicator in response to receiving the stop message (block 222). In this example, the mobile application 134 executing on the smartphone 132 is configured to display on the screen of the smartphone 132 a suitable user interface element that a technician can interact with in order to indicate that the technician would like the one or more LEDs 122 that are associated with the port 104 (or patch panel 102) involved with the current step of the work order to stop being illuminated (or otherwise visually actuated). In this example, when the mobile application 134 receives such user input from the technician, the mobile application 134 sends a message to the aggregation point 124 (the external entity in this example) indicating that the aggregation point 124 should stop illuminating or otherwise visually actuating the relevant LEDs 122. The aggregation point 124 does this in response to receiving such a message.

In this way, the technician is provided with a convenient way to cause the LEDs 122 (or other visual indicators) that are associated with the current step of the electronic work order to be visually actuated (and thereafter stopped) while the technician is on-site and performing that step.

FIGS. 3A-3K are example screenshots of one exemplary embodiment of a mobile application 134 and electronic work order application 126 that can be used with the system 100 of FIG. 1.

Figure 3A:
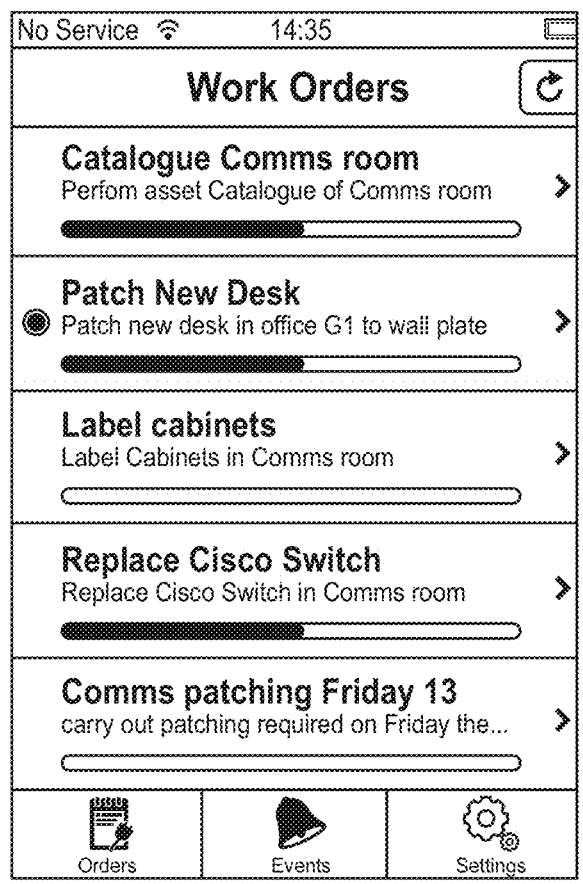

FIG. 3A is a screenshot of a "Work Orders" screen displayed by the mobile application 134 on the smartphone 132. This Work Orders screen displays a technician's active work orders. The percentage of each work order that is completed is displayed using a bar control (where the orange part of the bar control indicates how much of the work order has been completed). Also, in this example, the active work order (for example, one for which one or more LEDs 122 are illuminated or otherwise actuated) is indicated by a LED icon.

FIG. 3B is a screenshot of a "Work Order List" screen of the electronic work order application 126 that lists some of the work orders shown in the example of FIG. 3A.

Figure 3C:
Figure 3D:
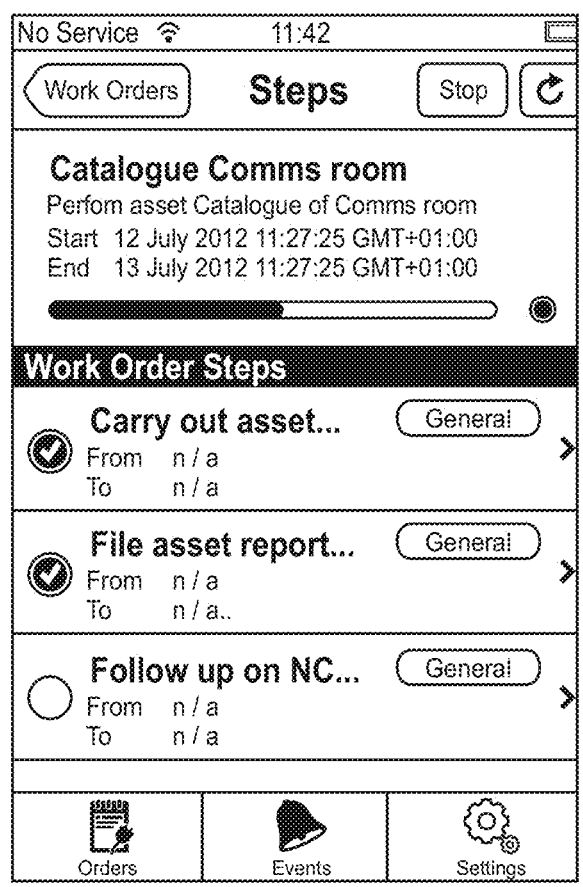
Figure 3E:

FIGS. 3C-3D are screenshots of "Steps" screens displayed by the mobile application 134 on the smartphone 132.

A Step screen is displayed when the technician taps on a particular work order displayed in the Work Orders (shown in FIG. 3A). For example, FIG. 3C shows the Step screen that is displayed if the technician taps on the work order labeled "Comms patching Friday 13", and FIG. 3D shows the Step screen that is displayed if the technician taps on the work order labeled "Catalogue Comms room". For each step, the start and end dates for that step are displayed. To start working on that step, the technician can tap the Start button is displayed in that Step screen. If the step is a managed step and the mobile application 134 is connected to the aggregation point 124, tapping the Start button causes the aggregation point 124 to visually actuate any associated LEDs 122 (for exampled, by flashing the LEDs 122). This provides a visual signal to aid the technician in carrying out the step. To stop working on that step, the technician can tap the Stop button that is displayed in that Step screen. This causes the aggregation point 124 to stop visually actuating any associated LEDs 122. The mobile application 134 provides a convenient mechanism for the technician to cause the LEDs 122 to be visually actuated in order to provide the technician visual assistance in carrying out that step.

For steps that involve a connection or disconnection of a connection, "to" and "from" ports are displayed on the screen. Also, the different types of steps (for example, Connect, Disconnect, General) can be color-coded (for example, Connect steps can be displayed using the color green, Disconnect steps can be displayed using the color red, and General steps can be displayed using the color grey). In this example, the technician can indicate that a general step has been completed by tapping a circle to "check off" that step as being completed. Managed steps can be marked as being completed as follows. When the indicated connector 108 is inserted into or removed from a port 104 of a managed patch panel 102, the software 118 associated with that port 104 will detect that event and read the information from the associated storage device 110 (in the case of an insertion) and report the event back to the aggregation point 124. The aggregation point 124, in response to such an event, will verify that the correct port 104 has been affected and, if it has, will communicate with the mobile application 134 to indicate that the step has been correctly completed. This requires the mobile application 134 to be in communication with the aggregation point 124. In this example, the screen can be refreshed by tapping on the Refresh button.

As noted above, a technician can enter comments about, and take photos related to, a particular step if required. FIG.

Figure 3F:

3E is a screenshot of one example of a Step screen that shows how Comments and Photos can be associated with a step. The technician can enter a Comment by tapping on the "Add a Comment" control, which causes a field to be displayed that the technician can enter the comment into. The technician can view photos that have been associated with the step by tapping on the Photo control, which, as shown in FIG. 3F, lists any Photos that have been associated with that step. The technician can tap the Camera icon in order to take a new photo or to select an existing photo from the photo library on the smartphone 132. The mobile application then associated the new or selected photo with that step. These photos require uploading to the aggregation point 124 and/or electronic work order application 126. Those photos that have not yet been uploaded are identified, in this example, with a Cloud icon, which the technician can tap in order to cause the selected photo to be uploaded. After the photo has been uploaded, the Cloud icon is no longer displayed. In the example shown in FIGS. 3E and 3F, these Comment and Photo features are used with the "general" steps of an electronic work order (though they can be used with other types of steps as well in other examples).

Figure 3G:
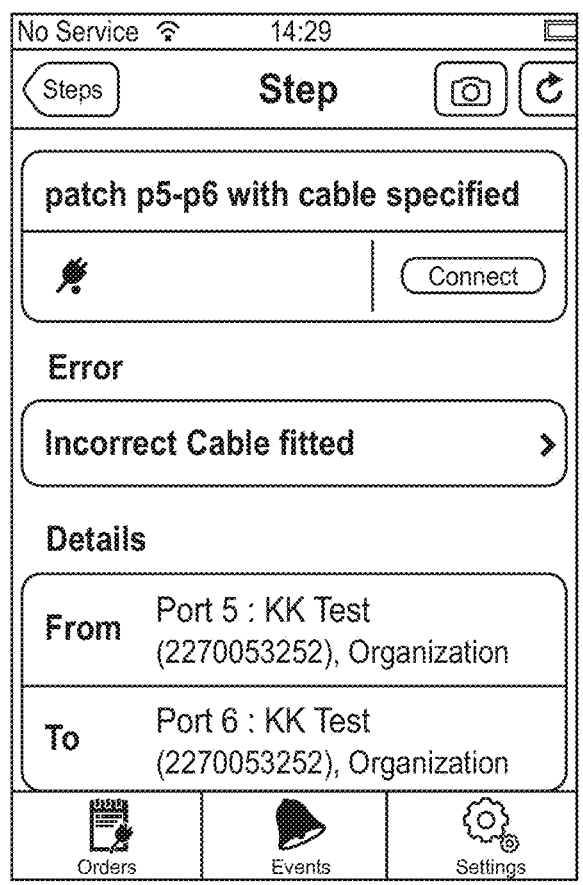

The mobile application 134 is also configured to display information about any errors that occur in connection with performing a step. One example of an error that is reported in a step screen is shown in FIG. 3G. Additional details about the error can be viewed by tapping on the "Incorrect Cable fitted" button.

Figure 3H:
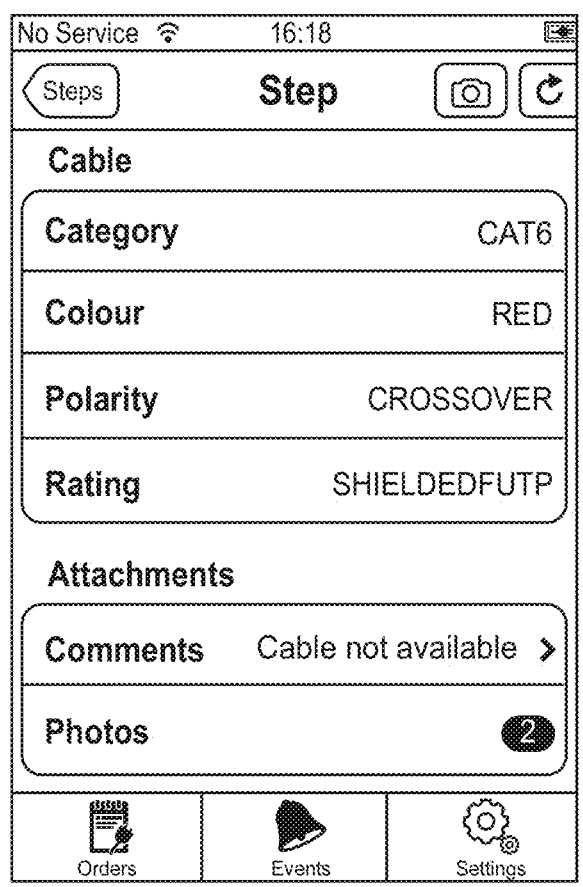

The mobile application 134 is also configured to display details about the cables involved in a step. One example of a cable detail screen is shown in FIG. 3H. As shown in FIG. 3H, Comments and Photos can be associated with the cable.

Figure 3I:

As noted above, the mobile application 134 is also configured to display information about events and alarms. FIG. 3I is a screenshot of one example of an Event screen displayed by the mobile application 134. In this example, those events that are associated with open alarms are indicated by a red alarm clock signal.

FIG. 3J shows a screenshot of one example of an Event Viewer screen that is displayed by the electronic work order application 124.

Figure 3K:
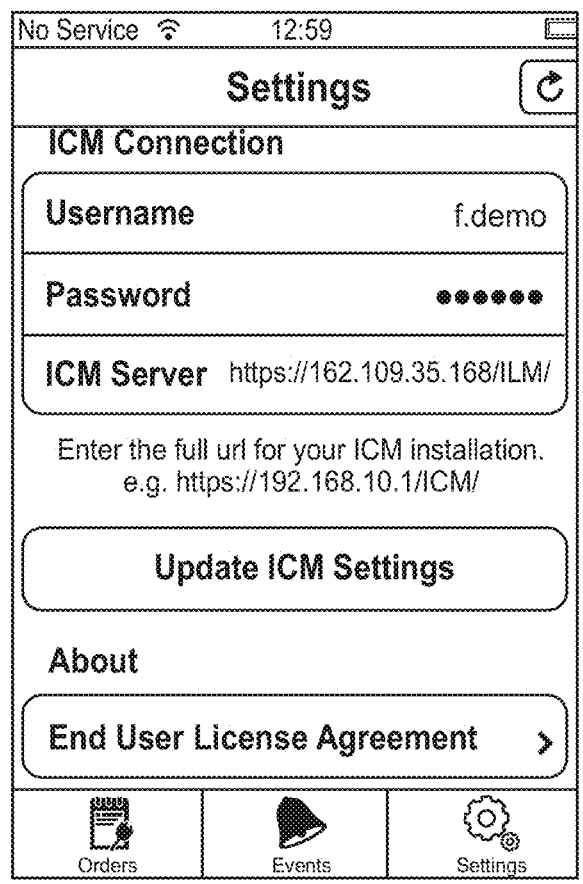

FIG. 3K is a screenshot of one example of a Settings screen that a technician can use to log into the aggregation point 124. As shown in FIG. 3K, the technician can enter a username and password and view and change an IP address for the aggregation point 124 (also referred to as the ICM Server) using this screen. In this example, updates are applied by tapping the Update ICM Settings button. The technician can also use this screen to view an End User License Agreement for the mobile application 134.

Example Embodiments

Example 1 includes a method of performing the steps of a work order, the method comprising: generating an electronic work order, the electronic work order comprising a set of steps; communicating the electronic work order to a mobile application executing on a smartphone; using a camera included in the smartphone to take a picture related to the performance of at least one step associated with the electronic work order; associating the picture with the at least one step; and communicating the picture to an entity for use in documenting the at least one step.

Example 2 includes the method of Example 1 and further includes displaying information about one or more of the steps associated with the electronic work order using the mobile application executing on the smartphone.

Example 3 includes any of the methods of Examples 1-2 and further includes displaying information about events and alarms using the mobile application executing on the smartphone.

Example 4 includes a method of performing the steps of a work order, the method comprising: generating an electronic work order, the electronic work order comprising a set of steps; communicating the electronic work order to a mobile application executing on a smartphone; receiving a user input indicating that a visual indicator associated with at least one step included in the electronic work order should be visually actuated; and sending a message from the mobile application executing on the smartphone to an external entity, wherein the external entity is configured to visually actuate the visual indicator in response to receiving the message.

Example 5 includes the method of Example 4, wherein the visual indicator comprises at least one light emitting diode.

Example 6 includes the method of Example 5, wherein visually actuating the light emitting diode comprises at least one of illuminate the light emitting diode, flashing the light emitting diode, and changing the color of the light emitting diode.

Example 7 includes any of the methods of Examples 4-6 and further includes: receiving a user input indicating that the visual indicator associated with the at least one step included in the electronic work order should stop being visually actuated; and sending a stop message from the mobile application executing on the smartphone to the external entity, wherein the external entity is configured to stop visually actuating the visual indicator in response to receiving the stop message.

Example 8 includes a program product for implementing a mobile application on a smartphone, tangibly stored on a non-transitory storage medium, comprising instructions operable to cause at least one programmable processor in the smartphone to: receive an electronic work order comprising a set of steps; use a camera included in the smartphone to take a picture related to the performance of at least one step associated with the electronic work order; associate the picture with the at least one step; and communicate the picture to an entity for use in documenting the at least one step.

Example 9 includes the program product of Example 8 and further comprises instructions operable to cause the at least one programmable processor in the smartphone to display information about one or more of the steps associated with the electronic work order using the mobile application executing on the smartphone.

Example 10 includes the program product of any of the Examples 8-9 and further comprises instructions operable to cause the at least one programmable processor in the smartphone to display information about events and alarms using the mobile application executing on the smartphone.

Example 11 includes a program product for implementing a mobile application on a smartphone, tangibly stored on a non-transitory storage medium, comprising instructions operable to cause at least one programmable processor in the smartphone to: receive an electronic work order comprising a set of steps; receive a user input indicating that a visual indicator associated with at least one step included in the electronic work order should be visually actuated; and send a message from the mobile application executing on the smartphone to an external entity, wherein the external entity is configured to visually actuate the visual indicator in response to receiving the message.

Example 12 includes the program product of Example 11, wherein the visual indicator comprises at least one light emitting diode.

Example 13 includes the program product of Example 12, wherein visually actuating the light emitting diode comprises at least one of illuminate the light emitting diode, flashing the light emitting diode, and changing the color of the light emitting diode.

Example 14 includes any of the program products of Examples 11-13 and further comprises instructions operable to cause the at least one programmable processor in the smartphone to receive a user input indicating that the visual indicator associated with the at least one step included in the electronic work order should stop being visually actuated; and send a stop message from the mobile application executing on the smartphone to the external entity, wherein the external entity is configured to stop visually actuating the visual indicator in response to receiving the stop message.

Example 15 includes a system that includes an aggregation point configured to receive and store information about connections made in a communication network; an electronic work order entity configured to generate an electronic work order, the electronic work order comprising a set of steps; a smartphone configured to receive the electronic work order using a mobile application executing on a smartphone; wherein the smartphone comprises a camera, wherein the mobile application is configured to: take a picture related to the performance of at least one step associated with the electronic work order, associate the picture with the at least one step; and communicating the picture to at least one of the aggregation point and the electronic work order entity for use in documenting the at least one step.

Example 16 includes the system of Example 15, wherein the mobile application is configured to display information about one or more of the steps associated with the electronic work order.

Example 17 includes the system of Example 15, wherein the mobile application is configured to display information about events and alarms.

Example 18 includes a system that includes: an aggregation point configured to receive and store information about connections made in a communication network; an electronic work order entity configured to generate an electronic work order, the electronic work order comprising a set of steps; a smartphone configured to receive the electronic work order using a mobile application executing on a smartphone; wherein the mobile application is configured to: receive a user input indicating that a visual indicator associated with at least one step included in the electronic work order should be visually actuated; and send a message from the mobile application executing on the smartphone to an external entity, wherein the external entity is configured to visually actuate the visual indicator in response to receiving the message.

Example 19 includes the system of Example 18, wherein the visual indicator comprises at least one light emitting diode.

Example 20 includes the system of Example 19, wherein visually actuating the light emitting diode comprises at least one of illuminate the light emitting diode, flashing the light emitting diode, and changing the color of the light emitting diode.

Example 21 includes any of the systems of Examples 18-19, wherein the mobile application is configured to: receive a user input indicating that the visual indicator associated with the at least one step included in the electronic work order should stop being visually actuated; and send a stop message from the mobile application executing on the smartphone to the external entity, wherein the external entity is configured to stop visually actuating the visual indicator in response to receiving the stop message.

A number of embodiments have been described. Nevertheless, it will be understood that various modifications to the described embodiments may be made without departing from the spirit and scope of the claimed invention. Also, combinations of the individual features of the above-described embodiments are considered within the scope of the inventions disclosed here.

The invention claimed is:

1. A method, comprising:
generating an electronic work order, the electronic work order comprising a set of steps that are to be carried out by a single technician at a particular location, wherein at least one step of the set of steps includes adding, moving, or changing a connection made at a first port of a device;
communicating the electronic work order to a mobile application executing on a smartphone;
displaying information about the at least one step of the set of steps included in the electronic work order with the mobile application executing on the smartphone;
receiving a first user input, at the mobile application executing on the smartphone, during performance of the at least one step of the set of steps included in the electronic work order, the first user input requesting that an electronic visual indicator associated with visually assisting the technician in carrying out the at least one step of the set of steps included in the electronic work order be visually actuated, wherein the electronic visual indicator is located on the device, distinct from the smartphone, having one or more ports to attach cables to the device, wherein the electronic visual indicator is associated with the first port of the one or more ports where a connection is changed as part of the at least one step of the set of steps included in the electronic work order;
in response to the received first user input requesting that the electronic visual indicator associated with visually assisting the technician in carrying out the at least one step of the set of steps included in the electronic work order be visually actuated, sending a request from the mobile application executing on the smartphone to an external entity, wherein the external entity visually actuates the electronic visual indicator in response to receiving the request from the mobile application executing on the smartphone;
receiving a second user input, at the mobile application executing on the smartphone, during performance of the at least one step of the set of steps included in the electronic work order, the second user input requesting that the electronic visual indicator associated with visually assisting the technician in carrying out the at least one step of the set of steps included in the electronic work order stop being visually actuated; and
in response to the received second user input requesting that the electronic visual indicator associated with visually assisting the technician in carrying out the at least one step of the set of steps included in the electronic work order stop being visually actuated, sending a stop request from the mobile application executing on the smartphone to the external entity, wherein the external entity is configured to stop visually actuating the electronic visual indicator in response to receiving the stop request from the mobile application executing on the smartphone; and wherein the method further comprises at least one of:
receiving an additional user input, at the mobile application executing on the smartphone, indicating that a second step of the set of steps included in the electronic work order has been completed; and
receiving a communication from the external entity, at the mobile application executing on the smartphone, verifying that the at least one step of the set of steps included in the electronic work order that includes adding, moving, or changing the connection made at the first port of the device has been correctly completed.

2. The method of claim 1, wherein the electronic visual indicator comprises at least one light emitting diode.

3. The method of claim 2, wherein visually actuating the light emitting diode comprises at least one of illuminating the light emitting diode, flashing the light emitting diode, and changing the color of the light emitting diode.

4. The method of claim 1, further comprising receiving, at the mobile application executing on the smartphone, a third user input indicating that the at least one step of the set of steps included in the electronic work order, which includes adding, moving, or changing the connection made at the first port of the device, has been completed.

5. The method of claim 4, comprising:
receiving an additional user input, at the mobile application executing on the smartphone, indicating that a second step of the set of steps included in the electronic work order has been completed; and
receiving a communication from the external entity, at the mobile application executing on the smartphone, verifying that the at least one step of the set of steps included in the electronic work order, which includes adding, moving, or changing the connection made at the first port of the device, has been correctly completed;
the method further comprising receiving a second communication from the external entity, at the mobile application executing on the smartphone, verifying that second step of the set of steps included in the electronic work order has been correctly completed.

6. A program product for implementing a mobile application on a smartphone, tangibly stored on a non-transitory storage medium, comprising instructions operable to cause at least one programmable processor in the smartphone to:
receive an electronic work order comprising a set of steps that are to be carried out by a single technician at a particular location, wherein at least one step of the set of steps includes adding, moving, or changing a connection made at a first port of a device;
display information about the at least one step of the set of steps included in the electronic work order;
receive a first user input during performance of the at least one step of the set of steps included in the electronic work order, the first user input requesting that an electronic visual indicator associated with visually assisting the technician in carrying out at least one step of the set of steps included in the electronic work order be visually actuated, wherein the electronic visual indicator is located on a device, distinct from the smartphone, having one or more ports to attach cables to the device, wherein the electronic visual indicator is associated with the first port of the one or more ports where a connection is changed as part of the at least one step of the set of steps included in the electronic work order;
in response to the received first user input requesting that the electronic visual indicator associated with visually assisting the technician in carrying out at least one step of the set of steps included in the electronic work order be visually actuated, send a request from the mobile application executing on the smartphone to an external entity, wherein the external entity visually actuates the electronic visual indicator in response to receiving the request from the mobile application executing on the smartphone;
receive a second user input during performance of the at least one step of the set of steps included in the electronic work order, the second user input requesting that the electronic visual indicator associated with visually assisting the technician in carrying out the at least one step of the set of steps included in the electronic work order stop being visually actuated; and
in response to the received second user input requesting that the electronic visual indicator associated with visually assisting the technician in carrying out the at least one step of the set of steps included in the electronic work order stop being visually actuated, send a stop request from the mobile application executing on the smartphone to the external entity, wherein the external entity is configured to stop visually actuating the electronic visual indicator in response to receiving the stop request from the mobile application executing on the smartphone; and
wherein the program product further comprises instructions operable to cause the at least one programmable processor in the smartphone to:
receive an additional user input, at the mobile application executing on the smartphone, indicating that a second step of the set of steps included in the electronic work order has been completed; and/or
receive a communication from the external entity, at the mobile application executing on the smartphone, verifying that the at least one step of the set of steps included in the electronic work order that includes adding, moving, or changing the connection made at the first port of the device has been correctly completed.

7. The program product of claim 6, wherein the electronic visual indicator comprises at least one light emitting diode.

8. The program product of claim 7, wherein visually actuating the light emitting diode comprises at least one of illuminating the light emitting diode, flashing the light emitting diode, and changing the color of the light emitting diode.

9. The program product of claim 6, further comprising instructions operable to cause the at least one programmable processor in the smartphone to receive a third user input indicating that the at least one step of the set of steps included in the electronic work order, which includes adding, moving, or changing the connection made at the first port of the device, has been completed.

10. The program product of claim 9, comprising instructions operable to cause the at least one programmable processor in the smartphone to:
receive an additional user input, at the mobile application executing on the smartphone, indicating that a second step of the set of steps included in the electronic work order has been completed; and receive a communication from the external entity, at the mobile application executing on the smartphone, verifying that the at least one step of the set of steps included in the electronic work order, which includes adding, moving, or changing the connection made at the first port of the device, has been correctly completed;

the program product further comprising instructions operable to cause the at least one programmable processor in the smartphone to receive a second communication from the aggregation point, at the mobile application executing on the smartphone, verifying that second step of the set of steps included in the electronic work order has been correctly completed.

11. A system comprising:

an aggregation point configured to receive and store information about connections made in a communication network;

an electronic work order entity configured to generate an electronic work order, the electronic work order comprising a set of steps that are to be carried out by a single technician at a particular location, wherein at least one step of the set of steps includes adding, moving, or changing a connection made at a first port of a device; and a smartphone configured to receive the electronic work order using a mobile application executing on a smartphone;

wherein the mobile application executing on the smartphone is configured to:

display information about the at least one step of the set of steps included in the electronic work order with the mobile application executing on the smartphone;

receive a first user input during performance of the at least one step of the set of steps included in the electronic work order, the first user input requesting that an electronic visual indicator associated with visually assisting the technician in carrying out the at least one step of the set of steps included in the electronic work order be visually actuated, wherein the electronic visual indicator is located on the device, distinct from the smartphone, having one or more ports to attach cables to the device, wherein the electronic visual indicator is associated with the first port of the one or more ports where a connection is changed as part of the at least one step of the set of steps included in the electronic work order;

in response to the received first user input requesting that the electronic visual indicator associated with visually assisting the technician in carrying out the at least one step of the set of steps included in the electronic work order be visually actuated, send a request from the mobile application executing on the smartphone to the aggregation point, wherein the aggregation point visually actuates the electronic visual indicator in response to receiving the request from the mobile application executing on the smartphone;

receive a second user input during performance of the at least one step of the set of steps included in the electronic work order, the second user input requesting that the electronic visual indicator associated with visually assisting the technician in carrying out the at least one step of the set of steps included in the electronic work order stop being visually actuated; and in response to the received second user input requesting that the electronic visual indicator associated with visually assisting the technician in carrying out the at least one step of the set of steps included in the electronic work order stop being visually actuated, send a stop request from the mobile application executing on the smartphone to the aggregation point, wherein the aggregation point is configured to stop visually actuating the electronic visual indicator in response to receiving the stop request from the mobile application executing on the smartphone; and wherein the mobile application executing on the smartphone is further configured to:

receive an additional user input, at the mobile application executing on the smartphone, indicating that a second step of the set of steps included in the electronic work order has been completed; and/or receive a communication from the aggregation point, at the mobile application executing on the smartphone, verifying that the at least one step of the set of steps included in the electronic work order that includes adding, moving, or changing the connection made at the first port of the device has been correctly completed.

12. The system of claim 11, wherein the electronic visual indicator comprises at least one light emitting diode.

13. The system of claim 12, wherein visually actuating the light emitting diode comprises at least one of illuminating the light emitting diode, flashing the light emitting diode, and changing the color of the light emitting diode.

14. The system of claim 11, wherein the mobile application executing on the smartphone is further configured to receive a third user input indicating that the at least one step of the set of steps included in the electronic work order, which includes adding, moving, or changing the connection made at the first port of the device, has been completed.

15. The system of claim 14, wherein the mobile application executing on the smartphone is configured to:

receive an additional user input, at the mobile application executing on the smartphone, indicating that a second step of the set of steps included in the electronic work order has been completed; and receive a communication from the aggregation point, at the mobile application executing on the smartphone, verifying that the at least one step of the set of steps included in the electronic work order, which includes adding, moving, or changing the connection made at the first port of the device, has been correctly completed;

wherein the mobile application executing on the smartphone is further configured to receive a second communication from the aggregation point, at the mobile application executing on the smartphone, verifying that second step of the set of steps included in the electronic work order has been correctly completed.

* * * * *